(12) United States Patent
Matsuhisa

(10) Patent No.: US 12,269,477 B2
(45) Date of Patent: Apr. 8, 2025

(54) VEHICLE MANAGEMENT SYSTEM

(71) Applicant: HONDA MOTOR CO., LTD., Tokyo (JP)

(72) Inventor: Tetsuya Matsuhisa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 17/874,695

(22) Filed: Jul. 27, 2022

(65) Prior Publication Data
US 2023/0033508 A1 Feb. 2, 2023

(30) Foreign Application Priority Data
Jul. 30, 2021 (JP) ................. 2021-126087

(51) Int. Cl.
*G05D 1/00* (2024.01)
*B60W 40/064* (2012.01)
*B60W 40/068* (2012.01)

(52) U.S. Cl.
CPC ........ *B60W 40/064* (2013.01); *B60W 40/068* (2013.01); *G05D 1/0088* (2013.01); *B60W 2520/26* (2013.01)

(58) Field of Classification Search
CPC ............. B60W 40/064; B60W 40/068; B60W 2520/26; G05D 1/0088
See application file for complete search history.

(56) References Cited

FOREIGN PATENT DOCUMENTS

| | | | | |
|---|---|---|---|---|
| JP | 2007-22282 A | 2/2007 | | |
| JP | 2018-169826 | 11/2018 | | |
| JP | 2018-173765 A | 11/2018 | | |
| JP | 2018169826 A | * 11/2018 | | |
| JP | 2019-107930 | 7/2019 | | |
| JP | 2019107930 A | * 7/2019 | ............ | A01B 69/00 |
| JP | 2019-165665 | 10/2019 | | |
| JP | 2019165665 A | * 10/2019 | | |
| JP | 2020-76657 A | 5/2020 | | |
| JP | 2020-193849 A | 12/2020 | | |
| WO | WO-2019117094 A1 | * 6/2019 | ............ | A01B 69/00 |
| WO | 2019/187122 | 10/2019 | | |
| WO | WO-2019187122 A1 | * 10/2019 | ........... | A01D 34/008 |

OTHER PUBLICATIONS

Japanese Office Action dated May 21, 2024 issued in corresponding Japanese application No. 2021-126087; English machine translation included (9 pages).

* cited by examiner

*Primary Examiner* — Jamel E Williams
(74) *Attorney, Agent, or Firm* — Rankin, Hill & Clark LLP (57) ABSTRACT

A vehicle management system includes: a map calculation unit that calculates a slip map in which a traveling position of an autonomous vehicle and a statistical value of slip index values on the traveling position are associated; and a vehicle extraction unit that extracts, as a target vehicle, the autonomous vehicle that has measured an outlier of the slip index value on a traveling route compared to the slip map.

15 Claims, 7 Drawing Sheets

VEHICLE MANAGEMENT SYSTEM

INCORPORATION BY REFERENCE

The present application claims priority under 35 U.S.C. § 119 to Japanese Patent Application No. 2021-126087 filed on Jul. 30, 2021. The content of the application is incorporated herein by reference in its entirety.

BACKGROUND OF THE INVENTION

Field of the Invention

The present invention relates to a vehicle management system that manages autonomous vehicles.

Description of the Related Art

Pamphlet of International Publication No. WO 2019/187122 discloses a robot lawn mower as an autonomous vehicle, which measures a positional distribution of the slip rate at work places and performs control to conduct speed reduction or the like according to the slip rate when traveling through the position where the slip rate is equal to or more than a prescribed value.

Japanese Patent Laid-Open No. 2019-165665 discloses an automatic traveling system that allows a tractor to automatically travel along a target traveling route including a plurality of parallel work routes and a plurality of turning routes. With the automatic traveling system, the turning route is corrected based on the slip rate of the tractor on the work route such that the tractor comes to be positioned on an extended line of the next work route after the turning.

Japanese Patent Laid-Open No. 2019-107930 discloses an automatic traveling vehicle in which the slip rate is measured at the time of traveling, and whether the state of traveling road surface is suited or not for automatic traveling is determined based on the measured slip rate. Furthermore, Japanese Patent Laid-Open No. 2019-107930 also discloses that automatic traveling of the automatic traveling vehicle is stopped based on the above determination result and that, when the slip rate exceeding a prescribed value is observed, the speed for shifting to a turning motion is increased or the vehicle body is inclined such that the height on the outer side of the vehicle body becomes higher when in a turning motion.

Japanese Patent Laid-Open No. 2018-169826 discloses a tractor as an agricultural work vehicle which, when found that the tractor is approaching the point where the slip rate is high based on past slip rate information indicating geographical distribution of the past slip rates in a field, weakens control sensitivity for keeping the right-and-left inclination posture of a work machine mounted to the tractor or sets the depth of plow of a power tiller to be shallower.

With the conventional technologies, operation control and route setting of the vehicle are performed based on the measured slip rates of the vehicle, so that appropriate operation control and route setting for the current state of the vehicle may be achieved.

With all of the conventional techniques, however, no determination is performed regarding degradation of the vehicle itself related to occurrence of slip, such as tire wear, for example. Therefore, the vehicle is continuously operated in a slippery state, for example, so that work efficiency and the like of the vehicle may be deteriorated.

It is therefore an object of the present invention to be able to appropriately determine whether a change in the condition related to slip is occurring or not in a vehicle based on the slip state of the vehicle.

SUMMARY OF THE INVENTION

An aspect of the present invention is a vehicle management system managing an autonomous vehicle, the vehicle management system including: a position acquisition unit that acquires position information of a traveling position of the autonomous vehicle; a measurement unit that measures a slip index value indicating slippiness of the autonomous vehicle on the traveling position; a map calculation unit that calculates, based on the traveling position and the slip index value measured in a plurality of times of traveling performed by the autonomous vehicle, a slip map in which the traveling position and a statistical value of the slip index values are associated; and a vehicle extraction unit that extracts, as a target vehicle, the autonomous vehicle having, at least in a part of a traveling route, an outlier of the slip index value measured with respect to the statistical value indicated in the slip map.

According to another aspect of the present invention, the map calculation unit calculates the slip map for each category of the autonomous vehicle, and the vehicle extraction unit uses the slip map of each category to extract the target vehicle for each category of the autonomous vehicle.

According to still another aspect of the present invention, the category indicates a classification regarding similarity in vehicle design including vehicle weight or a vehicle gravity center position of the autonomous vehicle.

According to yet another aspect of the present invention, the category indicates a classification based on weight or a gravity center position of the autonomous vehicle including loaded luggage.

According to another aspect of the present invention, the category indicates a classification based on accumulated traveling time and/or accumulated traveling distance of the autonomous vehicle.

According to still another aspect of the present invention, the slip index value is a slip rate when the autonomous vehicle travels on the traveling position.

According to yet another aspect of the present invention, the vehicle management system further includes a travel planning unit that generates a travel plan including a plan of a traveling route of the autonomous vehicle, in which the travel planning unit plans, based on the slip map, the traveling route by selecting a route where the statistical value of the slip rate as the slip index value is equal to or less than a prescribed value.

According to another aspect of the present invention, the travel plan includes a plan regarding a traveling speed of the autonomous vehicle on the traveling route, and the travel planning unit plans the traveling speed of the autonomous vehicle based on the slip map such that, on the traveling route, the traveling speed of a position where the statistical value of the slip rate as the slip index value is equal to or more than the prescribed value becomes equal to or less than a prescribed value.

According to still another aspect of the present invention, the slip index value is a friction coefficient of a road surface of the traveling position calculated from a slip rate when the autonomous vehicle travels on the traveling position and from weight and a gravity center position of the autonomous vehicle.

According to yet another aspect of the present invention, the vehicle management system further includes a travel planning unit that plans a traveling route of the autonomous vehicle, in which the travel planning unit plans, based on the slip map, the traveling route by selecting a route where the statistical value of the friction coefficient as the slip index value is equal to or more than a value corresponding to a friction level of wheels of the autonomous vehicle.

According to another aspect of the present invention, the vehicle management system further includes an environmental information acquisition unit that acquires environmental information as information regarding an environmental condition related to a road surface condition of the traveling position, in which the vehicle extraction unit determines, based on the environmental information, whether a factor for the outlier of the slip index value measured by the target vehicle is caused due to a temporal change in the environmental condition on the corresponding traveling position or not, and when the factor is the temporal change in the environmental condition, the travel planning unit plans the traveling route not including the corresponding traveling position until the environmental condition returns to an original state.

According to still another aspect of the present invention, the environmental information includes information regarding weather, temperature, and humidity of the traveling position or regarding whether the road surface of the traveling position is wet or frozen.

According to yet another aspect of the present invention, the vehicle management system further includes an image acquisition unit that acquires, from an imaging device provided in the autonomous vehicle, an environment image as an image of a surrounding environment of the autonomous vehicle on the traveling position, in which, as the environmental information, the environmental information acquisition unit acquires, by using the image acquisition unit, the environment image of the traveling position where the outlier of the slip index value was measured by the target vehicle from the imaging device of the autonomous vehicle that travels on the traveling position after the target vehicle.

According to another aspect of the present invention, the vehicle management system further includes: an image acquisition unit that acquires, from an imaging device provided in the autonomous vehicle, an environment image as an image of a surrounding environment of the autonomous vehicle on the traveling position; and a travel management unit that manages traveling of the autonomous vehicle, in which, when the autonomous vehicle is about to enter a caution point on the slip map, the caution point having the statistical value of the slip index value being out of a prescribed range, the travel management unit: acquires the environment image from the autonomous vehicle by the image acquisition unit, and displays the environment image on a display device; and acquires an instruction from an operator via a terminal device regarding whether to select an autonomous traveling mode or a remote control mode for an operation mode of the autonomous vehicle when traveling through the caution point.

According to the present invention, it is possible to appropriately determine whether a change in the condition related to slip is occurring in the vehicle based on the slip state of the vehicle.

DETAILED DESCRIPTION OF THE PREFERRED EMBODIMENTS

Hereinafter, an embodiment of the present invention will be described with reference to the accompanying drawings.

1. Configuration of Vehicle Management System

Figure 1:
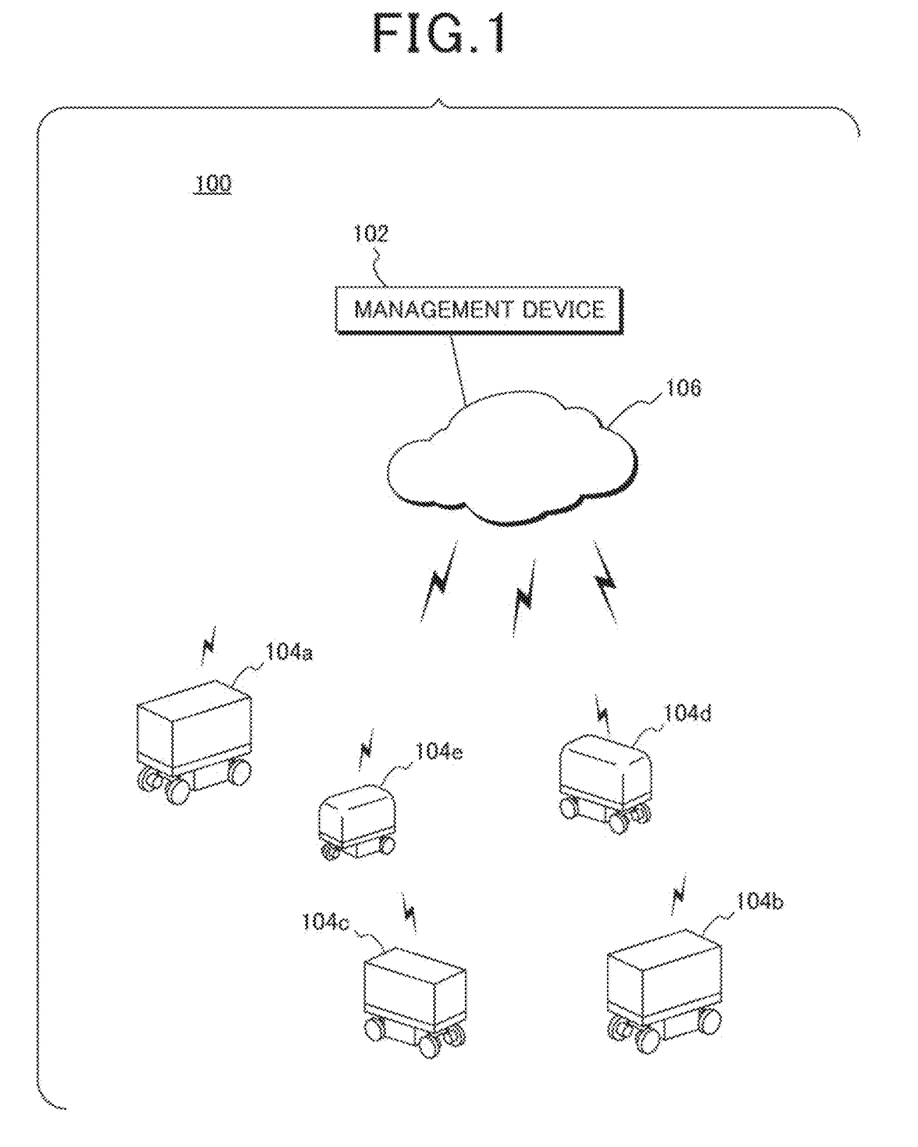
FIG. 1 is a diagram illustrating a configuration of a vehicle management system according to an embodiment of the present invention.

FIG. 1 is a diagram illustrating a configuration of a vehicle management system 100 according to the embodiment of the present invention. The vehicle management system 100 includes a management device 102, and a plurality of autonomous vehicles 104a, 104b, 104c, 104d, and 104e which autonomously travel under management of the management device 102. Hereinafter, the autonomous vehicles 104a, 104b, 104c, 104d, and 104e may collectively be referred to as the autonomous vehicle 104.

The management device 102 is a server, for example. Furthermore, the autonomous vehicle 104 in the embodiment is a wagon, for example. However, it is simply an example, and the autonomous vehicle 104 may be any autonomous vehicle having arbitrary functions. For example, the autonomous vehicle 104 may be a lawn mower working on the lawn. While five autonomous vehicles 104 are illustrated in FIG. 1, there may be an arbitrary number of autonomous vehicles 104 managed by the management device 102, and the vehicle management system 100 can include not only five but any other number of autonomous vehicles 104.

The management device 102 and each of the autonomous vehicles 104 are communicably connected via a communication network 106.

Figure 2:
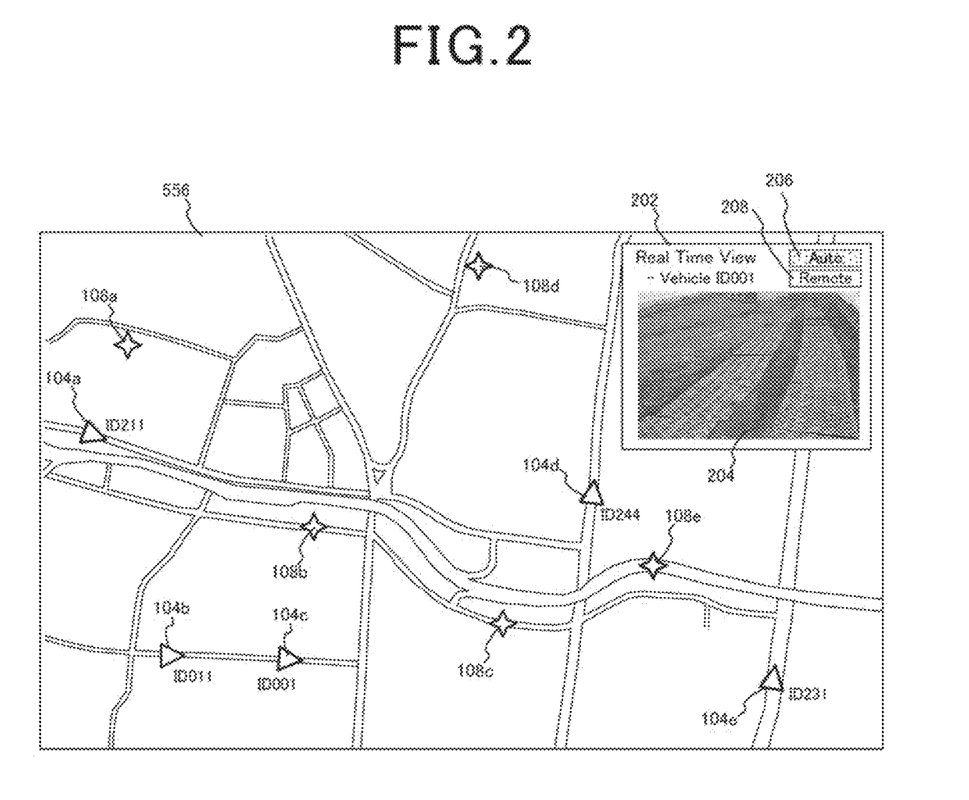
FIG. 2 is a diagram illustrating an example of a management screen displayed by a management device.

FIG. 2 is a diagram illustrating an example of a management screen displayed on a display device 552 (to be described later) of a terminal device 550 connected to the management device 102, which is an example of a scene where the vehicle management system 100 is used. On a display screen 556 of the display device 552, a route map of areas managed by the management device 102 is displayed. Each of the autonomous vehicles 104 travels within the area under the management of the management device 102, and transports luggage, for example.

In FIG. 2, each of the autonomous vehicles 104 that travel under the management of the management device 102 is indicated by a triangle on the route map, and an identification number of the autonomous vehicle 104 is indicated in the vicinity thereof as ID001 or the like, for example. Furthermore, the destination of each of the autonomous vehicles 104 is indicated by a white cross mark. In the scene illustrated in FIG. 2, according to a route instruction from the management device 102, each of the autonomous vehicles 104a, 104b, 104c, 104d, and 104e is traveling toward destinations 108a, 108b, 108c, 108d, and 108e along the traveling route indicated by the route instruction.

On the display screen 556 illustrated in FIG. 2, an image 204 as an environment image transmitted from one autonomous vehicle 104c is further displayed in a display window 202 in the upper right side of the screen in the drawing. Details of the display window 202 will be described later.

2. Configuration of Collection/Delivery Robot

Figure 3:
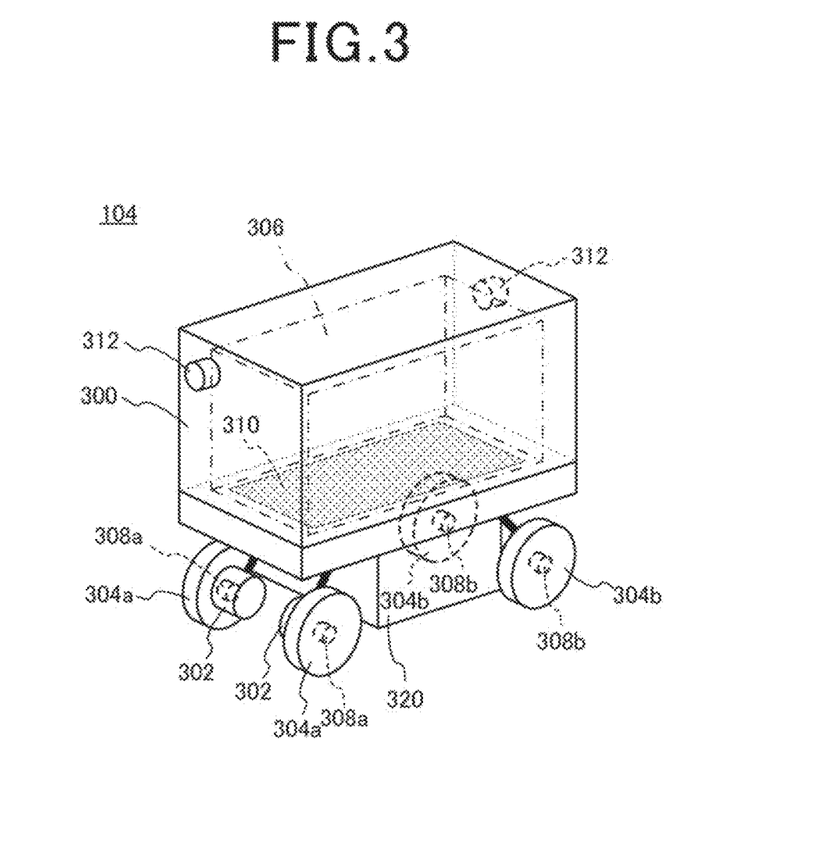
FIG. 3 is a diagram illustrating a configuration of an autonomous vehicle.
Figure 4:
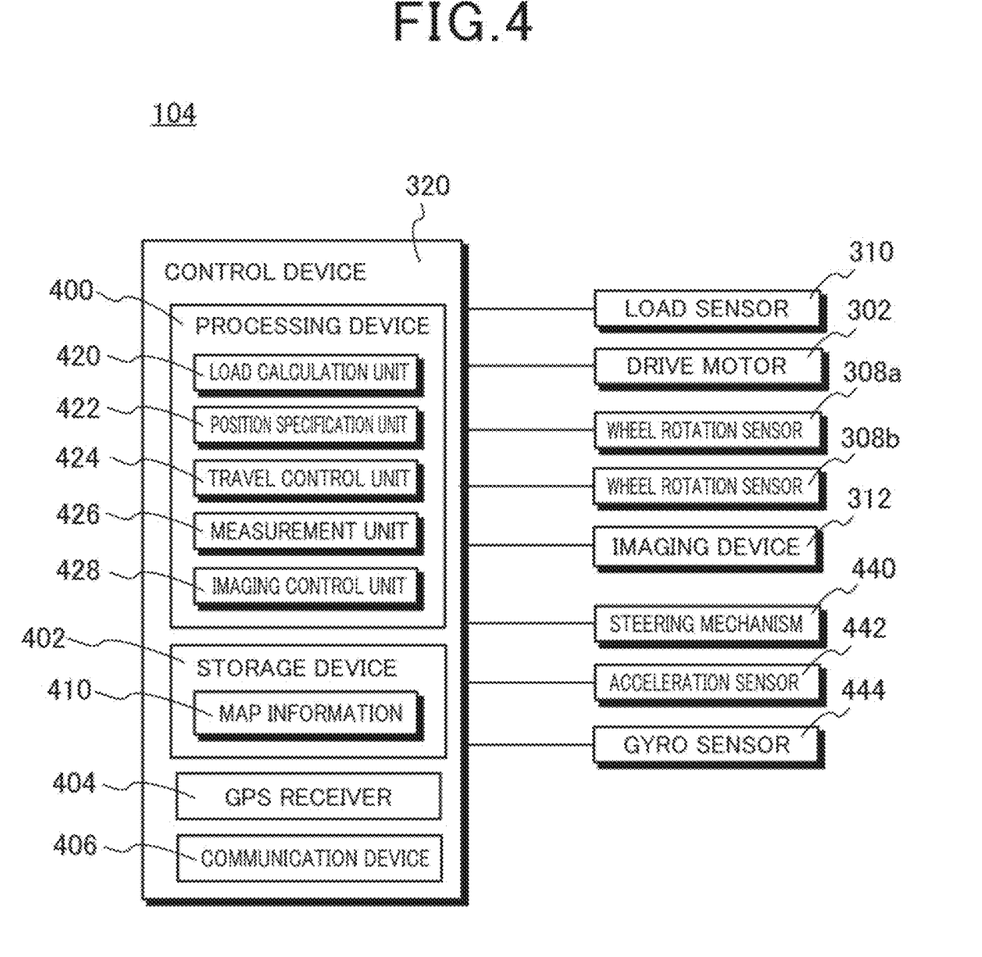
FIG. 4 is a diagram illustrating a functional configuration of the autonomous vehicle.

FIG. 3 is a diagram illustrating a configuration of the autonomous vehicle 104, and FIG. 4 is a diagram illustrating a functional configuration of the autonomous vehicle 104. While the configuration of a four-wheel autonomous vehicle same as the autonomous vehicle 104a is illustrated in FIG. 3 and FIG. 4 as a way of example, the autonomous vehicles 104 configuring the vehicle management system 100 may be vehicles having the size, shape, number of wheels, and/or wheel drive mechanism different from each other.

The autonomous vehicle 104 includes: a luggage box 300 where luggage is to be placed; two drive motors 302; two driving wheels 304a that are driven by the respective drive motors 302; two driven wheels 304b; and a control device 320. A wheel rotation sensor 308a is provided in each of the two driving wheels 304a, and a wheel rotation sensor 308b is provided in each of the two driven wheels 304b. As for the driven wheel 304b, the steering angle is controlled by a steering mechanism 440 (not illustrated in FIG. 3) provided in the autonomous vehicle 104.

Inside the luggage box 300, a luggage chamber 306 (space surrounded by an alternate long and short dash line in the drawing) is provided, and a load sensor 310 is placed on the bottom face of the luggage chamber 306. The load sensor 310 is formed with a plurality of pressure sensors provided in matrix on the bottom face of the luggage chamber 306. Furthermore, in the luggage box 300, an imaging device 312 is provided on each of surfaces facing in the front and rear sides of the traveling direction. The imaging device 312 is a camera, for example. Furthermore, an acceleration sensor 442 and a gyro sensor 444 (both not illustrated in FIG. 3) are provided at appropriate positions (for example, in the luggage box 300 or in the chassis of the control device 320) of the autonomous vehicle 104.

When the autonomous vehicle 104 is not a carrier but a vehicle to which no luggage is loaded, the autonomous vehicle 104 does not necessarily need to include the luggage box 300, the luggage chamber 306, the load sensor 310, and a load calculation unit 420 (to be described later). When the autonomous vehicle 104 does not include the luggage box 300, the imaging device 312 may be provided in a vehicle body the autonomous vehicle 104 normally has.

Referring to FIG. 4, the control device 320 includes a processing device 400, a storage device 402, a GPS receiver 404, and a communication device 406. The storage device 402 is configured with a volatile and/or nonvolatile semiconductor memory, and/or a hard disk device or the like, for example, and stores map information 410.

The GPS receiver 404 receives GPS radio waves from a GPS satellite, and generates position data indicating a current position (for example, latitude and longitude) of the autonomous vehicle 104. The communication device 406 is a wireless transceiver for communicating with the management device 102 via the communication network 106.

The processing device 400 is a computer that includes a processor such as a CPU, for example. The processing device 400 may be configured to include a ROM to which a program has been written, a RAM for temporarily storing data, and the like.

The processing device 400 includes the load calculation unit 420, a position specification unit 422, a travel control unit 424, a measurement unit 426, and an imaging control unit 428 as functional elements or functional units.

The functional elements provided in the processing device 400 are implemented by executing the program by the processing device 400 that is a computer, for example. Note that the computer program may be stored in an arbitrary computer readable storage medium. Instead, a whole part or a part of the functional elements of the processing device 400 may be configured with hardware including at least one or more electronic circuit components each.

The load calculation unit 420 calculates the gravity center and weight of the autonomous vehicle 104 in a state with luggage being loaded thereon based on sensor information from the load sensor 310 provided in the luggage chamber 306. Specifically, the load calculation unit 420 measures distribution of load (load distribution) on the bottom face of the luggage chamber 306 and total amount of load (load total amount) (corresponding to weight of loaded article) by the load sensor 310 provided in the luggage chamber 306.

Furthermore, the load calculation unit 420 calculates the gravity center and weight of the autonomous vehicle 104 in a state with the luggage being loaded thereon based on the measured load distribution and load total amount and information of the vehicle body weight and vehicle body gravity center of the autonomous vehicle 104. The gravity center of the autonomous vehicle 104 can be calculated as the amount of eccentricity from the geometrical center of a polygon having the positions of the driving wheels 304a and the driven wheels 304b on a plan view of the autonomous vehicle 104 from the above as the vertexes, for example.

The position specification unit 422 specifies the current position of the autonomous vehicle 104 at prescribed time intervals, for example, and transmits current position information indicating the specified position to the travel control unit 424 to be described later and the management device 102. Specifically, the position specification unit 422 specifies the current position of the autonomous vehicle 104 based on the position information from the GPS receiver 404 and inertial navigation system calculation using sensor data from the acceleration sensor 442 and the gyro sensor 444.

The travel control unit 424 controls the drive motor 302 and the steering mechanism 440 to allow the autonomous vehicle 104 to travel autonomously while specifying the current position by the position specification unit 422 based on a transport instruction received from the management device 102 and the map information 410 stored in the storage device 402. However, when there is an instruction from the management device 102 to switch to a remote control mode, the travel control unit 424 switches an operation mode to the remote control mode and controls the autonomous vehicle 104 to travel according to an operation instruction from the management device 102.

The measurement unit 426 measures a slip index value that indicates slippiness of the autonomous vehicle 104 on the current traveling position. The slip index value is a slip rate when the autonomous vehicle 104 travels on the traveling position. Instead or in addition to that, the slip index value may be a road surface friction coefficient of the traveling position. The road surface friction coefficient may be calculated from the slip rate when the autonomous vehicle 104 travels on the traveling position and from the weight and gravity center of the autonomous vehicle 104.

Specifically, the measurement unit 426 measures the rotation speed of each of the driving wheel 304a and the driven wheel 304b by the wheel rotation sensor 308a provided in the driving wheel 304a and the wheel rotation sensor 308b provided in the driven wheel 304b, for example. Furthermore, the measurement unit 426 calculates the vehicle speed of the driving wheel and the vehicle speed of the driven wheel from each of the measured rotation speeds and outer perimeters of each of the driving wheel 304a and the driven wheel 304b, and the slip rate is calculated and measured from a following formula.

Slip rate=(vehicle speed of driving wheel−vehicle speed of driven wheel)/vehicle speed of driving wheel In the embodiment, the measurement unit 426 further calculates the load the driving wheels 304a are to support based on the gravity center and the weight calculated by the load calculation unit 420, and calculates the road friction coefficient of the current traveling position from the calculated load and the calculated slip rate.

In FIG. 4, two each of the drive motors 302, wheel rotation sensors 308a, 308b, and imaging devices 312 are collectively illustrated in a single rectangle, respectively.

The measurement unit 426 measures the slip index value (that is, the slip rate and/or the friction coefficient value) at the same timing as that of specification of the current position by the position specification unit 422, for example, and transmits the measured slip index value to the management device 102.

The imaging control unit 428 controls the imaging devices 312 to acquire images of the surroundings in the traveling direction and the retreating direction of the autonomous vehicle 104. The images to be acquired may be moving images or still images. The imaging control unit 428 transmits the acquired images to the management device 102.

3. Configuration of Management Device

Figure 5:
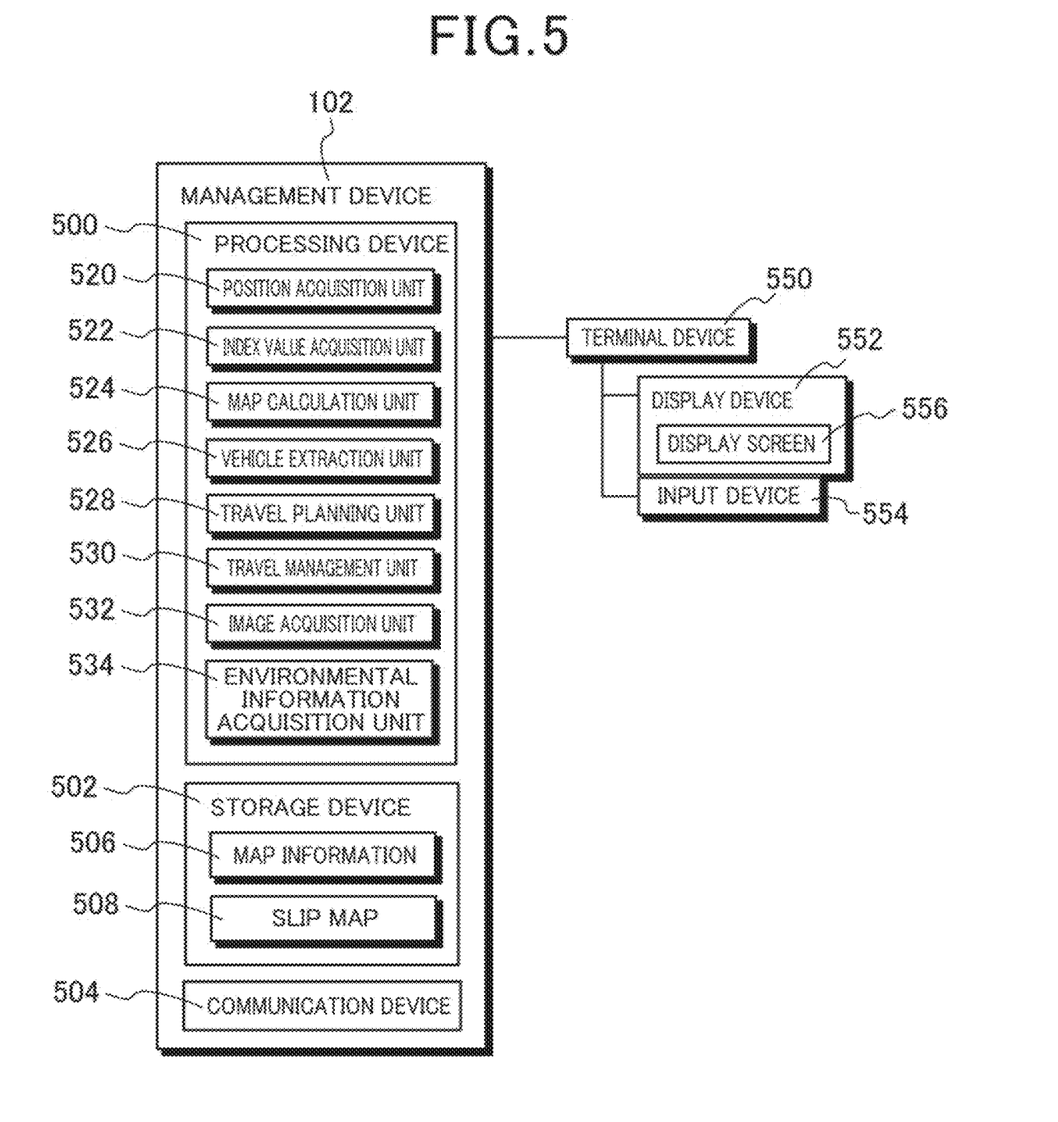
FIG. 5 is a diagram illustrating a configuration of the management device.

FIG. 5 is a diagram illustrating a configuration of the management device 102. A terminal device 550 as an interface with the operator is connected to the management device 102. The terminal device 550 includes the display device 552 having the display screen 556, and an input device 554. The display device 552 is a liquid crystal display, for example, and the input device 554 is a touch panel provided on the display screen 556 of the display device 552, for example. The management device 102 displays information and images on the display device 552, and acquires instructions and data input by the operator via the input device 554.

The management device 102 includes a processing device 500, a storage device 502, and a communication device 504. The communication device 504 is a transceiver for communicating with the autonomous vehicle 104 via the communication network 106.

The storage device 502 is configured with a volatile and/or nonvolatile semiconductor memory, and/or a hard disk device or the like, for example, and stores map information 506 and slip map 508. The slip map 508 will be described later.

The processing device 500 is a computer that includes a processor such as a CPU, for example. The processing device 500 may be configured to include a ROM to which a program has been written, a RAM for temporarily storing data, and the like.

The processing device 500 includes a position acquisition unit 520, an index value acquisition unit 522, a map calculation unit 524, a vehicle extraction unit 526, a travel planning unit 528, a travel management unit 530, an image acquisition unit 532, and an environmental information acquisition unit 534 as functional elements or functional units.

The functional elements provided in the processing device 500 are implemented by executing the program by the processing device 500 that is a computer, for example. Note that the computer program may be stored in an arbitrary computer readable storage medium. Instead, a whole part or a part of the functional elements of the processing device 500 may be configured with hardware including at least one or more electronic circuit components each.

The position acquisition unit 520 receives the current position information from the autonomous vehicle 104, and acquires the position information of the current traveling position of the autonomous vehicle 104.

The index value acquisition unit 522 acquires, from the autonomous vehicle 104, the slip rate and/or the road friction coefficient as the slip index value of the current position of the autonomous vehicle 104, which is measured by the measurement unit 426 of the autonomous vehicle 104.

The map calculation unit 524 calculates the slip map 508, in which the positions on the map and the statistical values of the slip index values on the positions are associated, based on the traveling positions and the slip index values measured for a plurality of times of traveling of the autonomous vehicle 104, and stores the calculated slip map 508 to the storage device 502.

Note here that "a plurality of times of traveling" may include not only traveling of a plurality of different autonomous vehicles 104, but also a plurality of times of traveling performed by a same autonomous vehicle 104 such as a plurality of times of traveling performed on days of different climates and time zones and a plurality of times of traveling performed by loading luggage of different weights and gravity centers, for example.

Furthermore, the statistical value of the slip index values may be the moving average, the median, or the mode of the slip index values of the traveling within a latest prescribed period or a latest prescribed number of times of traveling measured by the autonomous vehicle 104 on a same position of the map during the plurality of times of traveling, for example.

The map calculation unit 524 updates the statistical value of the position on the map corresponding to the current traveling position received by the position acquisition unit 520 from the autonomous vehicle 104 every time the slip index value measured by the autonomous vehicle 104 is received from the autonomous vehicle 104. Then, the map calculation unit 524 uses the updated statistical value to update the slip map stored in the storage device 502.

Thereby, the slip map 508, in which each of a plurality of positions on the map configuring the traveling route of the autonomous vehicle 104 and the statistical values of the latest slip index values of the positions on the map are associated, is stored to the storage device 502. That is, since the statistical value is the moving average or the like of the traveling within the latest prescribed period or the latest prescribed number of times of traveling, the slip map 508 indicates slippiness of each position of the traveling route upon which the current state of the traveling route is reflected.

Note that the map calculation unit 524 can calculate the slip map 508 for each of categories by calculating the statistical value of the slip index values for each of the categories of the autonomous vehicles 104.

In this case, the categories may be classifications regarding similarities of vehicle designs including the vehicle weight and vehicle gravity center of the autonomous vehicles 104. Alternatively, the categories may be classifications based on the weight or the gravity center position of the autonomous vehicles 104 including the luggage loaded thereon. Furthermore, the categories may be classifications based on accumulated traveling time or accumulated traveling distance of the autonomous vehicles 104.

The vehicle extraction unit 526 extracts, as a target vehicle, the autonomous vehicle 104 that has measured the outlier of the slip index value with respect to the statistical value indicated in the slip map 508 at least on a part of the traveling route. Specifically, upon receiving the slip index value from the autonomous vehicle 104, the vehicle extraction unit 526 refers to the slip map 508 to compare the statistical value of the position on the map corresponding to the current traveling position of the autonomous vehicle 104 with the received slip index value.

Then, when a deviation amount of the received slip index value with respect to the statistical value is larger than a prescribed value, for example, the vehicle extraction unit 526 determines that the received slip index value is an outlier, and extracts the autonomous vehicle 104 that is the transmitter of the slip index value as the target vehicle.

Note here that the statistical value of the slip index values at each position on the map indicated by the slip map 508 is the moving average or the like of the slip index values measured in a plurality of times of traveling of the autonomous vehicle 104, so that it is considered to indicate the slippiness mainly due to the condition of the traveling route which does not depend on the type of the individual autonomous vehicle 104 and/or the loading state of luggage or the like. In the meantime, the slip index value that is the outlier from the statistical value is considered to indicate the slippiness upon which, in addition to the condition of the traveling route, the condition specific to the autonomous vehicle 104 that has measured the slip index value.

Therefore, by determining whether the measured slip index value is the outlier or not through comparing the statistical value of the slip index values indicated in the slip map 508 with the slip index value measured by the autonomous vehicle 104 in real time, the vehicle management system 100 can appropriately determine whether there is a change in the condition related to slip occurring in the autonomous vehicle 104 from the slippiness (specifically, the slip index value) of the autonomous vehicle 104.

Specifically, as the main factor for such outlier of the slip index value is to be measured, there may be wear of the driving wheels 304a of the autonomous vehicle 104.

Therefore, for example, the vehicle extraction unit 526, upon extracting the target vehicle, can display the identification number of the autonomous vehicle 104 as the extracted target vehicle on the display device 552 of the terminal device 550 to propose the operator to do maintenance of the autonomous vehicle 104 such as wheel replacement.

Thereby, the autonomous vehicle 104 can receive the maintenance at an appropriate timing where there is an influence actually started to affect the slip index value such as the slip rate, so that the maintenance cost may be suppressed.

Note here that, since the slip rate can be directly grasped from the wheel rotation speed, it is possible to easily determine whether there is a change in the condition of the autonomous vehicle 104 and to easily extract the target vehicle when the slip rate is used as the slip index value.

Furthermore, since the road surface friction coefficient does not depend on the gravity center and the weight of the individual autonomous vehicle, it is possible to appropriately determine whether there is a change in the condition of the autonomous vehicle 104 and to appropriately extract the target vehicle without depending on the loading state of luggage as well as the weight and gravity center of the autonomous vehicle 104 itself, when the friction coefficient is used as the slip index value.

When the map calculation unit 524 generates the slip map 508 for each of the categories of the autonomous vehicles, the vehicle extraction unit 526 can extract the target vehicle for each of the categories by using the slip maps 508 of each of the categories. Thereby, by having groups of each of the autonomous vehicles 104 that may have a similar slip characteristic as the categories, the slip map 508 can be generated and the target vehicle may be extracted for each of the categories. Therefore, it is possible to more appropriately determine whether there is a change in the condition regarding the slip generated in the autonomous vehicle 104 or not.

For example, in a case where the classifications regarding similarity of the vehicle design including the vehicle weight or the vehicle gravity center position are used as the categories, it is possible to extract the target vehicle by more appropriately determining the change in the condition regarding the slip for each of the autonomous vehicles 104 having the similar slip characteristic due to the vehicle design. Furthermore, in a case where the classifications based on the weight or the gravity center of the autonomous vehicle 104 including the loaded luggage are used as the categories, it is possible to extract the target vehicle by more appropriately determining the change in the condition regarding the slip for each of the autonomous vehicles 104 having the similar slip characteristic due to the vehicle body balance while having the luggage loaded thereon.

Furthermore, for example, in a case where the classifications regarding the accumulated traveling time and/or the accumulated traveling distance of the autonomous vehicle 104 are used as the categories, it is possible to extract the target vehicle by more appropriately determining the change in the condition regarding the slip for each of the autonomous vehicles 104 having the similar slip characteristic due to the wear state of the wheels caused in accordance with traveling.

The vehicle extraction unit 526 may also determine whether the factor for the outlier of the slip index value is to be measured in the target vehicle is caused due to a temporal change in an environmental condition (for example, rainfall, freezing, or the like) of the corresponding traveling position or not based on the environmental information acquired by the environmental information acquisition unit 534 to be described later. In this case, for example, the vehicle extraction unit 526 does not display recommendation of maintenance on the display device 552, when the factor for the outlier is a temporal change in the environmental condition. Furthermore, the vehicle extraction unit 526 notifies the determination result to the travel planning unit 528 to be described later.

Thereby, the temporal environmental factor related to occurrence of slip can be eliminated, which makes it possible to extract the target vehicle by more appropriately determining the change in the condition related to occurrence of slip such as wear of the wheels or the like of the autonomous vehicle 104.

The travel planning unit 528 generates a travel plan including a plan of the traveling route of the autonomous vehicle 104 for a prescribed destination. The destination may be acquired from the operator via the input device 554, for example. In addition to the plan of the traveling route to the destination, the travel plan may include a plan of the traveling speed of the autonomous vehicle 104 on the traveling route. The travel planning unit 528 generates the travel plan based on the statistical value of the slip index values indicated in the slip map 508.

Hereinafter, "the statistical value of the slip index values indicated in the slip map" may simply be referred to as "the slip index value indicated in the slip map". Similarly, "the statistical value of the slip rates indicated in the slip map" may simply be referred to as "the slip rate indicated in the slip map", and "the statistical value of the friction coefficients indicated in the slip map" may simply be referred to as "the friction coefficient indicated in the slip map".

For example, in a case where the slip index values indicated in the slip map 508 are the slip rates, the travel planning unit 528 selects the route whose slip rate indicated in the slip map 508 is equal to or less than a prescribed value, and generates a plan of the traveling route. This enables the autonomous vehicle 104 to travel stably by avoiding the road sections having the high slip rate.

Furthermore, the travel planning unit 528 generates a plan of the traveling speed of the autonomous vehicle 104 such that the traveling speed becomes equal to or less than a prescribed value on the position of the traveling route where the slip rate indicated in the slip map 508 is equal to or more than the prescribed value. This makes it possible to set the speed of the autonomous vehicle 104 in accordance with the extent of the slip rate, so that it is possible to allow the autonomous vehicle 104 to travel stably even on the route having the high slip rate.

Furthermore, for example, in a case where the slip index value indicated in the slip map 508 is the friction coefficient, the travel planning unit 528 selects the route where the friction coefficient indicated in the slip map 508 becomes a value equal to or more than the wear level of the wheels of the autonomous vehicle 104, and generates a plan of the traveling route. This enables each of the autonomous vehicles 104 to travel more stably in accordance with the state of each of the autonomous vehicles 104.

Furthermore, when the vehicle extraction unit 526 determines that the factor for the outlier of the slip index value measured by the target vehicle is a temporal change in the environmental condition, the travel planning unit 528 generates a plan of the traveling route not including the traveling position corresponding to the outlier (that is, the traveling position where the outlier was measured) until the environmental condition returns to an original state. This makes it possible to prevent the road section having a temporal change in the environmental condition such as rainfall that affects slippiness from being excluded from the traveling route even after the change subsides. Note that the travel planning unit 528 may determine whether the temporal change in the environmental condition has returned to the original state or not from the environmental information acquired by the environmental information acquisition unit 534, for example.

The travel management unit 530 manages traveling of the autonomous vehicle 104. Specifically, the travel management unit 530 transmits a transport instruction including the travel plan generated by the travel planning unit 528 to the autonomous vehicle 104. Furthermore, on the display screen 556 of the display device 522, the travel management unit 530 displays a management screen that presents the map on which the current position of the autonomous vehicle 104 executing the transport instruction is indicated. The management screen illustrated in FIG. 2 is an example thereof.

Furthermore, when the autonomous vehicle 104 is about to enter a caution point on the slip map 508 where the statistical value of the slip index values is out of a prescribed range, the travel management unit 530 acquires an environment image from the autonomous vehicle 104 by using the image acquisition unit 532 to be described later, and displays it on the display device 552. Then, from the operator via the input device 554 of the terminal device 550, the travel management unit 530 acquires an instruction about the operation mode of the autonomous vehicle 104 when traveling at the caution point, regarding whether to use an autonomous traveling mode or a remote control mode.

For example, the travel management unit 530 provides the display window 202 in a part of the management screen displayed on the display screen 556 as illustrated in FIG. 2, and displays, in the display window 202, the image 204 as the environment image and the identification number ("-Vehicle ID001" in the case of the drawing) of the autonomous vehicle 104 that has transmitted the image.

Furthermore, in the display window 202, the travel management unit 530 displays an Auto button 206 for giving an instruction to the autonomous vehicle 104 to continue autonomous traveling and a Remote button 208 for giving an instruction to switch to the remote control mode. The operator touches the Remote button 208 to switch the autonomous vehicle 104 to be under the remote control. In the case of FIG. 2, the Auto button 206 is in a lighting state (hatched in the drawing), which indicates that the current operation mode of the autonomous vehicle 104 is an autonomous traveling mode.

Upon receiving the switching instruction to switch to the remote control mode from the operator via the terminal device 550, the travel management unit 530 transmits the switching instruction to the autonomous vehicle 104. Furthermore, the travel management unit 530 acquires an operation instruction for the autonomous vehicle 104 for remote control from the operator via the input device 554, and transmits it to the autonomous vehicle 104.

Thereby, when the autonomous vehicle 104 travels on a statistically slippery road section, the operator can operate the autonomous vehicle 104 to travel more securely by the remote control while grasping the environment in the surroundings of the autonomous vehicle by the image.

Thereafter, upon receiving an instruction to switch to the autonomous traveling mode (for example, when the Auto button 206 of FIG. 2 is pressed) from the operator via the terminal device 550, the travel management unit 530 gives an instruction to the travel planning unit 528 to generate a travel plan from the current position of the autonomous vehicle 104, and transmits a new transport instruction including the generated travel plan to the autonomous vehicle 104. The autonomous vehicle 104 that has received the transport instruction starts autonomous traveling according to the transport instruction.

The image acquisition unit 532 acquires an environment image that is the image of the surrounding environment on the traveling position of the autonomous vehicle 104 from the imaging device 312 of the autonomous vehicle 104.

The environmental information acquisition unit 534 acquires, as the environmental information, the information regarding the environmental condition related to the road surface condition on the traveling position of the autonomous vehicle 104. The environmental information may include information regarding the weather, temperature, and humidity of the traveling position or whether the road surface of the traveling position is wet or frozen.

For example, the environmental information acquisition unit 534 may acquire the environmental information from a weather information server (not illustrated) that is connected to the communication network 106 for providing weather information.

Furthermore, for example, when the target vehicle is extracted by the vehicle extraction unit 526, the environmental information acquisition unit 534 may acquire the environment image of the traveling position where the target vehicle has measured the outlier of the slip index value from another autonomous vehicle 104. Specifically, the environmental information acquisition unit 534 acquires, from another autonomous vehicle 104 traveling on the traveling position after the target vehicle, an image captured by the imaging device 312 of such another autonomous vehicle 104 as the environment image of the traveling position. Such an image is acquired via the image acquisition unit 532.

Thereby, the environmental information acquisition unit 534 acquires, by another autonomous vehicle, the image of the road surface on the traveling position of the autonomous vehicle 104 that has measured the outlier of the slip index value as the environmental information, for example, so that the vehicle extraction unit 526 and the like can appropriately determine, based on the image, whether the specific individual outlier is caused due to the environmental fluctuation such as the weather or due to local wet road surface and the like.

4. Operations of Vehicle Management System

Next, procedures of the processing of the vehicle management system 100 will be described by referring to the flowcharts illustrated in FIG. 6 and FIG. 7. The processing is started when the travel management unit 530 of the management device 102 acquires a luggage transport instruction that is input by the operator via the input device 554 of the terminal device 550, for example.

When the processing is started, first, the travel management unit 530 of the management device 102 selects the autonomous vehicle 104 to do the transport to the destination. Furthermore, according to a conventional technology, the travel management unit 530 prepares for transportation by giving an instruction to a staff member of a parking space (not illustrated) of the autonomous vehicles 104 to put the luggage into the selected autonomous vehicle 104 (S100). At that time, the load calculation unit 420 of the autonomous vehicle 104 calculates the gravity center and the weight of the entire autonomous vehicle 104 including the loaded luggage. The calculated gravity center and weight are transmitted to the management device 102 from the autonomous vehicle 104, and may be used by the map calculation unit 524, the vehicle extraction unit 526, and the like of the management device 102 for determining the category of the autonomous vehicle 104.

Next, the travel planning unit 528 refers to the slip map 508 stored in the storage device 502, and generates a travel plan for the destination based on the slip index value indicated in the slip map 508 (S102). The travel management unit 530 generates a transport instruction including the generated travel plan, and transmits it to the selected autonomous vehicle 104. The travel control unit 424 of the autonomous vehicle 104 receives the transport instruction and starts autonomous traveling for carrying out a transport operation according to the received transport instruction (S104).

At the same time, in the autonomous vehicle 104, the position specification unit 422 starts to specify the current position of the autonomous vehicle 104, and the measurement unit 426 starts to measure the slip index value (S106). Thereafter, the position specification unit 422 and the measurement unit 426 perform specification of the current position of the autonomous vehicle 104 and measurement of the slip index value on the current position, respectively, and transmit the information regarding the specified current position and the slip index value to the management device 102. The position acquisition unit 520 and the index value acquisition unit 522 of the management device 102 receive and acquire the transmitted information regarding the current position and the slip index value, respectively.

Furthermore, the travel control unit 424 performs autonomous traveling according to the travel plan included in the received transport instruction based on the current position specified by the position specification unit 422 and the map information 410 stored in the storage device 420.

Then, the travel management unit 530 of the management device 102 determines whether the autonomous vehicle 104 has arrived at the destination or not based on the current position acquired by the position acquisition unit 520 (S108). Then, when the autonomous vehicle 104 has arrived at the destination (YES in S108), the travel management unit 530 gives an instruction to the autonomous vehicle 104 to end the operation, thereby ending the processing.

In the meantime, when determined in step S108 that the autonomous vehicle 104 has not arrived at the destination (NO in step S108), the map calculation unit 524 of the management device 102 updates the slip map 508 stored in the storage device 502 based on the current position of the autonomous vehicle 104 and the slip index value measured at the current position, which are acquired by the position acquisition unit 520 and the index value acquisition unit 522 from the autonomous vehicle 104 (S100).

Then, the vehicle extraction unit 526 refers to the slip map 508, and determines whether the slip index value acquired by the index value acquisition unit 522 from the autonomous vehicle 104 is an outlier or not (S112). When the acquired sip index value is the outlier (YES in S112), the vehicle extraction unit 526 determines whether there is another autonomous vehicle 104 or not as a following vehicle that travels behind the autonomous vehicle 104 that has detected the outlier (S116).

Then, when there is another autonomous vehicle 104 as a following vehicle (YES in S116), the environmental information acquisition unit 534 of the management device 102 acquires an environment image of that point from the imaging device 312 of such another autonomous vehicle 104 (S118). Subsequently, the vehicle extraction unit 526 determines whether the factor for the outlier to be measured is caused due to a temporal environmental change on the current position of the autonomous vehicle 104 or not based on the environmental information acquired by the environmental information acquisition unit 534 (S120). In the meantime, when there is no such autonomous vehicle 104 as a following vehicle (NO in S116), step S120 is executed without acquiring an environment image. That is, when an environment image is acquired in step S118, the acquired environment image may be included in the environmental information used in step S120.

Then, when determined in step S120 that the outlier is not caused due to a temporal change in the environment (NO in S120), the vehicle extraction unit 526 extracts, as the target vehicle, the autonomous vehicle 104 that has measured the outlier (S122). Subsequently, the travel management unit 530 of the management device 102 determines whether the autonomous vehicle 104 has arrived at the caution point or not based on the current position acquired by the position acquisition unit 520 and the slip map 508 stored in the storage device 502 (S114).

In the meantime, when determined in step S120 that the outlier is caused due to a temporal change in the environment (YES in S120), the vehicle extraction unit 526 does not extract the target vehicle and the processing is shifted to step S114.

Then, when determined in step S114 that the autonomous vehicle 104 has not arrived at the caution point (NO in S114), autonomous traveling of the autonomous vehicle 104 is continued and the processing is returned to step S108. In the meantime, when determined in step S114 that the autonomous vehicle 104 has arrived at the caution point (YES in S114), the processing is shifted to step S200 of FIG. 7.

Figure 7:
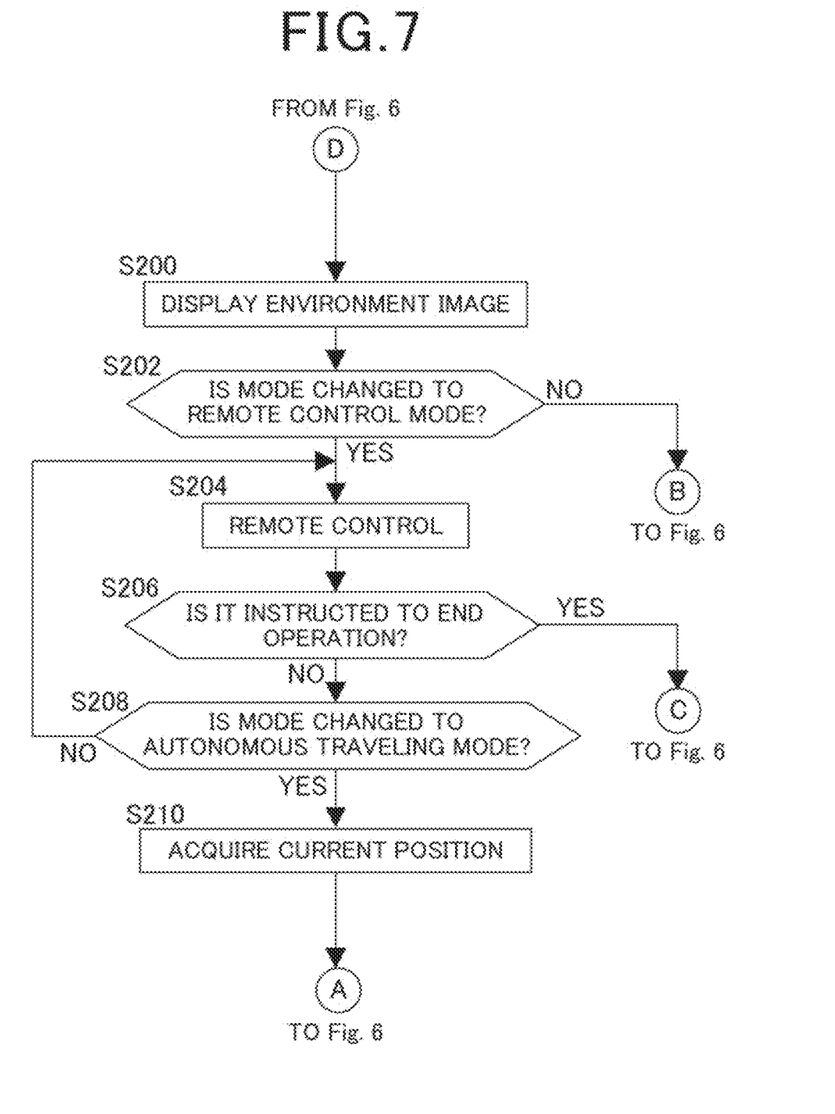
FIG. 7 is a flowchart illustrating the operation procedure of the vehicle management system.

In step S200 of FIG. 7, the travel management unit 530 of the management device 102 acquires an environment image from the autonomous vehicle 104 by the image acquisition unit 532, and displays it on the display device 552. Then, the travel management unit 530 determines whether there is an instruction to change to the remote control mode received from the operator via the input device 554 or not (S202).

Figure 6:
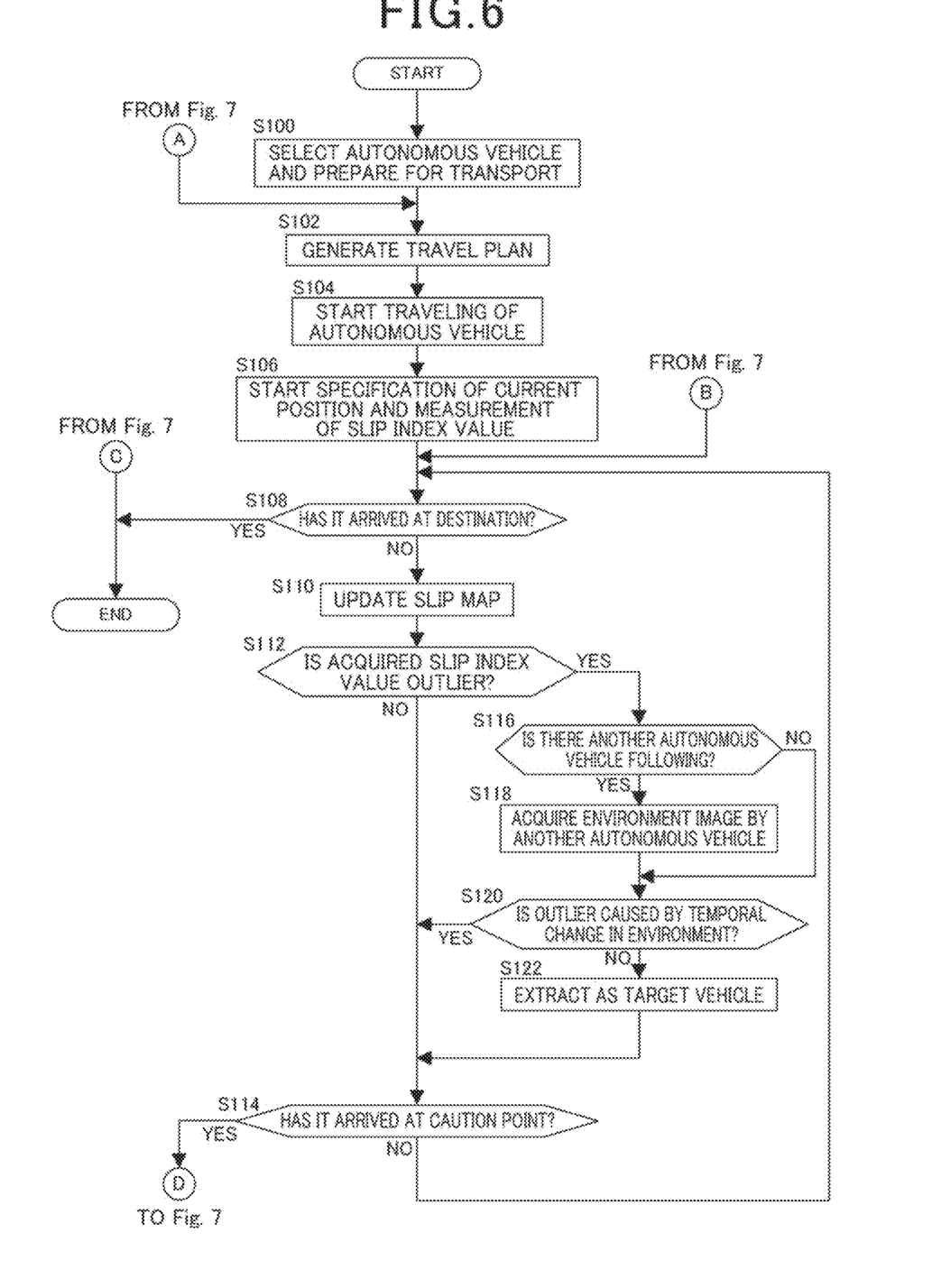
FIG. 6 is a flowchart illustrating an operation procedure of the vehicle management system.

Then, when there is no instruction to change to the remote control mode received from the operator (NO in S202), autonomous traveling of the autonomous vehicle 104 is continued and the processing is returned to step S108 of FIG. 6.

In the meantime, when determined in step S202 that there is an instruction to change to the remote control mode received from the operator (YES in S202), the travel management unit 530 receives a remote control command input by the operator via the input device 554, and performs a remote control of the autonomous vehicle 104 (S204). Then, the travel management unit 530 determines whether an instruction to end the operation is input as a remote control command or not (S206). When determined that the instruction to end the operation is input (YES in S206), the travel management unit 530 gives an instruction to the autonomous vehicle 104 to end the operation, and the processing is returned to FIG. 6 and ended.

In the meantime, when no instruction to end the operation is input as a remote control command (NO in S206), the travel management unit 530 determines whether there is an instruction to change to the autonomous traveling mode input by the operator via the input device 554 or not (S208). Then, when there is no instruction to change to the autonomous traveling mode (NO in S208), the travel management unit 530 retunes to step S204 and repeats the remote control operation.

In the meantime, when determined in step S208 that the instruction to change to the autonomous traveling mode is input (YES in S208), the travel management unit 530 acquires the current position of the autonomous vehicle 104 by the position acquisition unit 520 (S210), and gives an instruction to the travel planning unit 528 to generate a new travel plan from the acquired current position. Thereby, the processing of the vehicle management system 100 is returned to step S102 of FIG. 6 where a new travel plan is generated and autonomous traveling of the autonomous vehicle 104 according to the generated new travel plan is started.

5. Another Embodiment

In the vehicle management system 100, a part of the functional elements provided in the processing device 500 of the management device 102 may be provided in the processing device 400 of the autonomous vehicle 104, and a part of the functional elements provided in the processing device 400 may be provided in the processing device 500.

For example, the travel planning unit 528 provided in the processing device 500 of the management device 102 may be provided in the processing device 400 of the autonomous vehicle 104. Furthermore, the function of the load calculation unit 420 provided in the processing device 400 of the autonomous vehicle 104 may be provided in the processing device 500 of the management device 102.

Furthermore, in the embodiment above, the map calculation unit 524 is described to update the slip map 508 by using all slip index values including the outlier acquired from the autonomous vehicle 104, before the vehicle extraction unit 526 determines whether the slip index value acquired from the autonomous vehicle 104 is an outlier or not (steps S110 and S112 of FIG. 6). Instead, the map calculation unit 524 may be configured to update the slip map 508 after determination of the outlier performed by the vehicle extraction unit 526, and not to update the slip map 508 by using the slip index value that is an outlier, when it is determined that the acquired slip index value is the outlier.

Furthermore, in the embodiment above, the vehicle extraction unit 526 is described to determine, based on the statistical value of the slip index value regarding the current position of the autonomous vehicle 104 indicated in the slip map 508, that the measured slip index value is an outlier when a deviation amount of the slip index value measured by the autonomous vehicle 104 at the current position with respect to the statistical value is larger than a prescribed value.

However, this is only an example, and the vehicle extraction unit 526 may be configured to determine whether the measured slip index value is an outlier or not by using any other arbitrary statistical methods. For example, the vehicle extraction unit 526 may calculate a standard deviation of the slip index value measured by the autonomous vehicle 104 at the current position in real time based on the distribution of the slip index values measured in the past (for example, in a specific past period) at the current position of the autonomous vehicle 104, and may determine the slip index value as the outlier when the calculated standard deviation exceeds a prescribed range.

In this case, the map calculation unit 524 needs to record, in the slip map 508, all slip index values measured in the specific past period at each position on the map in addition to the statistical values of the slip index values.

6. Configurations Supported by Aforementioned Embodiment and/or Another Aforementioned Embodiment (Configuration 1) A vehicle management system managing an autonomous vehicle, the vehicle management system including: a position acquisition unit that acquires position information of a traveling position of the autonomous vehicle; a measurement unit that measures a slip index value indicating slippiness of the autonomous vehicle on the traveling position; a map calculation unit that calculates, based on the traveling position and the slip index value measured in a plurality of times of traveling performed by the autonomous vehicle, a slip map in which the traveling position and a statistical value of the slip index values are associated; and a vehicle extraction unit that extracts, as a target vehicle, the autonomous vehicle having, at least in a part of a traveling route, an outlier of the slip index value measured with respect to the statistical value indicated in the slip map.

With the vehicle management system of Configuration 1, it is possible to extract the autonomous vehicle by appropriately determining whether a change in the condition related to slip is occurring in the autonomous vehicle based on the slip state of the autonomous vehicle.

(Configuration 2) In the vehicle management system according to Configuration 1, the map calculation unit calculates the slip map for each category of the autonomous vehicle, and the vehicle extraction unit uses the slip map of each category to extract the target vehicle for each category of the autonomous vehicle.

With the vehicle management system of Configuration 2, by having a group of each of the autonomous vehicles that may have a similar slip characteristic as the category, the slip map can be generated and the target vehicle may be extracted for each of the categories. Therefore, it is possible to more appropriately determine whether there is a change in the condition regarding the slip generated in the autonomous vehicle or not.

(Configuration 3) The vehicle management system according to Configuration 2, in which the category indicates a classification regarding similarity in vehicle design including vehicle weight or a vehicle gravity center position of the autonomous vehicle.

With the vehicle operation system of Configuration 3, it is possible to extract the target vehicle by more appropriately determining a change in the condition related to slip for each of the autonomous vehicles having similar slippiness caused due to the vehicle design.

(Configuration 4) The vehicle management system according to Configuration 2, in which the category indicates a classification based on weight or a gravity center position of the autonomous vehicle including loaded luggage.

With the vehicle management system of Configuration 4, it is possible to extract the target vehicle by more appropriately determining a change in the condition related to slip for each of the autonomous vehicles having similar slippiness caused due to the vehicle body balance in a state while loading luggage.

(Configuration 5) The vehicle management system according to any one of Configurations 2 to 4, in which the category indicates a classification based on accumulated traveling time and/or accumulated traveling distance of the autonomous vehicle.

With the vehicle management system of Configuration 5, it is possible to extract the target vehicle by more appropriately determining a change in the condition related to slip for each of the autonomous vehicles having similar slippiness caused due to the wheel wear state generated in accordance with traveling.

(Configuration 6) The vehicle management system according to any one of Configurations 1 to 5, in which the slip index value is a slip rate when the autonomous vehicle travels on the traveling position.

With the vehicle management system of Configuration 6, the slip rate that can be directly grasped from the wheel rotation speed is used. Therefore, it is possible to determine whether there is a change in the condition of the autonomous vehicle and to extract the target vehicle easily.

(Configuration 7) The vehicle management system according to Configuration 6, further including a travel planning unit that generates a travel plan including a plan of a traveling route of the autonomous vehicle, in which the travel planning unit plans, based on the slip map, the traveling route by selecting a route where the statistical value of the slip rate as the slip index value is equal to or less than a prescribed value.

With the vehicle management system of Configuration 7, it is possible to allow the autonomous vehicle to travel stably by avoiding the road sections having the high slip rate.

(Configuration 8) The vehicle management system according to Configuration 7, in which the travel plan includes a plan regarding a traveling speed of the autonomous vehicle on the traveling route, and the travel planning unit plans the traveling speed of the autonomous vehicle based on the slip map such that, on the traveling route, the traveling speed of a position where the statistical value of the slip rate as the slip index value is equal to or more than the prescribed value becomes equal to or less than a prescribed value.

With the vehicle management system of Configuration 8, the speed of the autonomous vehicle can be set in accordance with the extent of the slip rate, so that it is possible to allow the autonomous vehicle to travel stably even on the route having the high slip rate.

(Configuration 9) The vehicle management system according to any one of Configurations 1 to 5, in which the slip index value is a friction coefficient of a road surface of the traveling position calculated from a slip rate when the autonomous vehicle travels on the traveling position and from weight and a gravity center position of the autonomous vehicle.

With the vehicle management system of Configuration 9, the friction coefficient not depending on the gravity center and the weight of the individual autonomous vehicle is used as the slip index value. Therefore, it is possible to appropriately determine whether there is a change in the condition of the autonomous vehicle and to appropriately extract the target vehicle without depending on the loading state of luggage as well as the weight and gravity center of the autonomous vehicle itself.

(Configuration 10) The vehicle management system according to Configuration 9, further including a travel planning unit that plans a traveling route of the autonomous vehicle, in which the travel planning unit plans, based on the slip map, the traveling route by selecting a route where the statistical value of the friction coefficient as the slip index value is equal to or more than a value corresponding to a friction level of wheels of the autonomous vehicle.

With the vehicle management system of Configuration 10, it is possible to allow each of the autonomous vehicles to travel more stably in accordance with the state of each of the autonomous vehicles.

(Configuration 11) The vehicle management system according to Configuration 7, 8, or 10, further including an environmental information acquisition unit that acquires environmental information as information regarding an environmental condition related to a road surface condition of the traveling position, in which the vehicle extraction unit determines, based on the environmental information, whether a factor for the outlier of the slip index value measured by the target vehicle is caused due to a temporal change in the environmental condition on the corresponding traveling position or not, and when the factor is the temporal change in the environmental condition, the travel planning unit plans the traveling route not including the corresponding traveling position until the environmental condition returns to an original state.

With the vehicle management system of Configuration 11, it is possible to prevent the road section having a temporal change in the environmental condition such as rainfall that affects slippiness from being excluded from the traveling route even after the change subsides.

(Configuration 12) The vehicle management system according to Configuration 11, in which the environmental information includes information regarding weather, temperature, and humidity of the traveling position or regarding whether the road surface of the traveling position is wet or frozen.

With the vehicle management system of Configuration 12, it is possible to dynamically plan the traveling route by considering changes in various environmental conditions.

(Configuration 13) The vehicle management system according to Configuration 11 or 12, further including an image acquisition unit that acquires, from an imaging device provided in the autonomous vehicle, an environment image as an image of a surrounding environment of the autonomous vehicle on the traveling position, in which, as the environmental information, the environmental information acquisition unit acquires, by using the image acquisition unit, the environment image of the traveling position where the outlier of the slip index value was measured by the target vehicle from the imaging device of the autonomous vehicle that travels on the traveling position after the target vehicle.

With the vehicle management system of Configuration 13, the image of the road surface on the traveling position of the autonomous vehicle that has measured the outlier of the slip index value is acquired by another autonomous vehicle as the environmental information, for example. Therefore, it is possible to appropriately determine whether the specific individual outlier is caused due to the environmental fluctuation such as the weather or due to local wet road surface and the like.

(Configuration 14) The vehicle management system according to any one of Configurations 1 to 13, further including: an image acquisition unit that acquires, from an imaging device provided in the autonomous vehicle, an environment image as an image of a surrounding environment of the autonomous vehicle on the traveling position; and a travel management unit that manages traveling of the autonomous vehicle, in which, when the autonomous vehicle is about to enter a caution point on the slip map, the caution point having the statistical value of the slip index value being out of a prescribed range, the travel management unit: acquires the environment image from the autonomous vehicle by the image acquisition unit, and displays the environment image on a display device; and acquires an instruction from an operator via a terminal device regarding whether to select an autonomous traveling mode or a remote control mode for an operation mode of the autonomous vehicle when traveling through the caution point.

With the vehicle management system of Configuration 14, when the autonomous vehicle travels on a statistically slippery road section, the operator can operate the autonomous vehicle to travel more securely by the remote control while grasping the environment in the surroundings of the autonomous vehicle.

However, the embodiments described above are only one aspect of the present invention, and it is to be noted that various changes and modifications are possible without departing from the spirit and scope of the present invention.

REFERENCE SIGNS LIST

100 Vehicle management system
102 Management device
104, 104a, 104b, 104c, 104d, 104e Autonomous vehicle
106 Communication network
108a, 108b, 108c, 108d, 108e Destination
202 Display window
204 Image
206 Auto button
208 Remote button
300 Luggage box
302 Drive motor
304a Driving wheel
304b Driven wheel
306 Luggage chamber
308a, 308b Wheel rotation sensor
310 Load sensor
312 Imaging device
320 Control device
400, 500 Processing device
402, 502 Storage device
404 GPS receiver
406, 504 Communication device
410, 506 Map information
420 Load calculation unit
422 Position specification unit
424 Travel control unit
426 Measurement unit
428 Imaging control unit
440 Steering mechanism
442 Acceleration sensor
444 Gyro sensor
508 Slip map
550 Terminal device
552 Display device
554 Input device
556 Display screen

What is claimed is:

1. A vehicle management system managing autonomous vehicles, the vehicle management system comprising a processor that includes:
a position acquisition unit that acquires position information of a traveling position of each of the autonomous vehicles;
a measurement unit that calculates, as a slip index value indicating slippiness of each of the autonomous vehicles on the traveling position, a slip rate of each of the autonomous vehicles on the traveling position or a friction coefficient of a road surface, the friction coefficient of the road surface being calculated from the slip rate;
a map calculation unit that calculates, based on the traveling position and the slip index value calculated in a plurality of times of traveling performed by at least one of the autonomous vehicles, a slip map in which each of a plurality of positions on a map configuring a traveling route of the corresponding autonomous vehicle and a statistical value of the slip index values that is calculated on each of the plurality of positions are associated; and
a vehicle extraction unit that extracts, as a target vehicle, an autonomous vehicle of the autonomous vehicles having, at least in a part of the traveling route, an outlier of the slip index value measured with respect to the statistical value indicated in the slip map.

2. The vehicle management system according to claim 1, wherein the autonomous vehicles include respective categories,
the map calculation unit calculates the slip map for each of the categories of the autonomous vehicles, and
the vehicle extraction unit uses the slip map of each of each of the categories to extract the target vehicle for each of the categories of the autonomous vehicles.

3. The vehicle management system according to claim 2, wherein each of the categories indicates a classification regarding similarity in vehicle design including vehicle weight or a vehicle gravity center position of the autonomous vehicle.

4. The vehicle management system according to claim 2, wherein each of the categories indicates a classification based on weight or a gravity center position of the autonomous vehicle including loaded luggage.

5. The vehicle management system according to claim 2, wherein each of the categories indicates a classification based on accumulated traveling time and/or accumulated traveling distance of the autonomous vehicle.

6. The vehicle management system according to claim 1, wherein the slip index value is the slip rate when the autonomous vehicle travels on the traveling position.

7. The vehicle management system according to claim 6, wherein the processor further includes a travel planning unit that generates a travel plan including a plan of a traveling route of the autonomous vehicle, and the travel planning unit plans, based on the slip map, the traveling route by selecting a route where the statistical value of the slip rate as the slip index value is equal to or less than a prescribed value.

8. The vehicle management system according to claim 6, wherein the processor further includes a travel planning unit that generates a travel plan including a plan of the traveling route of the autonomous vehicles,
the travel plan includes a plan regarding a traveling speed of the autonomous vehicle on the traveling route, and
the travel planning unit generates the travel plan based on the slip map such that, on the traveling route, the traveling speed of a position where the statistical value of the slip rate as the slip index value is equal to or more than the prescribed value becomes equal to or less than a prescribed value.

9. The vehicle management system according to claim 1, wherein the slip index value is the friction coefficient of the road surface of the traveling position calculated from the slip rate when the autonomous vehicle travels on the traveling position and from weight and a gravity center position of the autonomous vehicle.

10. The vehicle management system according to claim 9, wherein the processor further includes a travel planning unit that plans a traveling route of the autonomous vehicle, wherein the travel planning unit plans, based on the slip map, the traveling route by selecting a route where the statistical value of the friction coefficient as the slip index value is equal to or more than a value corresponding to a friction level of wheels of the autonomous vehicle.

11. The vehicle management system according to claim 7, wherein the processor further includes an environmental information acquisition unit that acquires environmental information as information regarding an environmental condition related to a road surface condition of the traveling position, wherein the vehicle extraction unit determines, based on the environmental information, whether a factor for the outlier of the slip index value measured by the target vehicle is caused due to a temporal change in the environmental condition on the corresponding traveling position, and
when the factor is the temporal change in the environmental condition, the travel planning unit plans the traveling route not including the corresponding traveling position until the environmental condition returns to an original state.

12. The vehicle management system according to claim 11, wherein the environmental information includes information regarding weather, temperature, and humidity of the traveling position or regarding whether the road surface of the traveling position is wet or frozen.

13. The vehicle management system according to claim 11, wherein the processor further includes an image acquisition unit that acquires, from an imaging device provided in the autonomous vehicle, an environment image as an image of a surrounding environment of the autonomous vehicle on the traveling position, wherein as the environmental information, the environmental information acquisition unit acquires, by using the image acquisition unit, the environment image of the traveling position where the outlier of the slip index value was measured by the target vehicle from the imaging device of the autonomous vehicle that travels on the traveling position after the target vehicle.

14. The vehicle management system according to claim 1, wherein the processor further includes:

an image acquisition unit that acquires, from an imaging device provided in the autonomous vehicle, an environment image as an image of a surrounding environment of the autonomous vehicle on the traveling position; and
a travel management unit that manages traveling of the autonomous vehicle, wherein
when the autonomous vehicle is about to enter a caution point on the slip map, the caution point having the statistical value of the slip index value being out of a prescribed range, the travel management unit:
acquires the environment image from the autonomous vehicle by the image acquisition unit, and displays the environment image on a display; and
acquires an instruction from an operator via a terminal device regarding whether to select an autonomous traveling mode or a remote control mode for an operation mode of the autonomous vehicle when traveling through the caution point.

15. A vehicle management system managing autonomous vehicles, the vehicle management system comprising a processor that includes:

a position acquisition unit that acquires position information of a traveling position of each of the autonomous vehicles;
a measurement unit that measures a slip index value indicating slippiness of each of the autonomous vehicles on the traveling position;
a map calculation unit that calculates, based on the traveling position and the slip index value measured in a plurality of times of traveling performed by at least one of the autonomous vehicles, a slip map in which the traveling position and a statistical value of the slip index values are associated; and
a vehicle extraction unit that extracts, as a target vehicle, the autonomous vehicle having, at least in a part of a traveling route, an outlier of the slip index value measured with respect to the statistical value indicated in the slip map, the autonomous vehicles include respective categories, the map calculation unit calculates the slip map for each of the categories of the autonomous vehicles, and the vehicle extraction unit uses the slip map of each of the categories to extract the target vehicle for each of the categories of the autonomous vehicle.

\* \* \* \* \*